(No Model.)
J. C. WELLER.
GRAIN DRIER OR MOISTENER.
No. 474,568. Patented May 10, 1892.
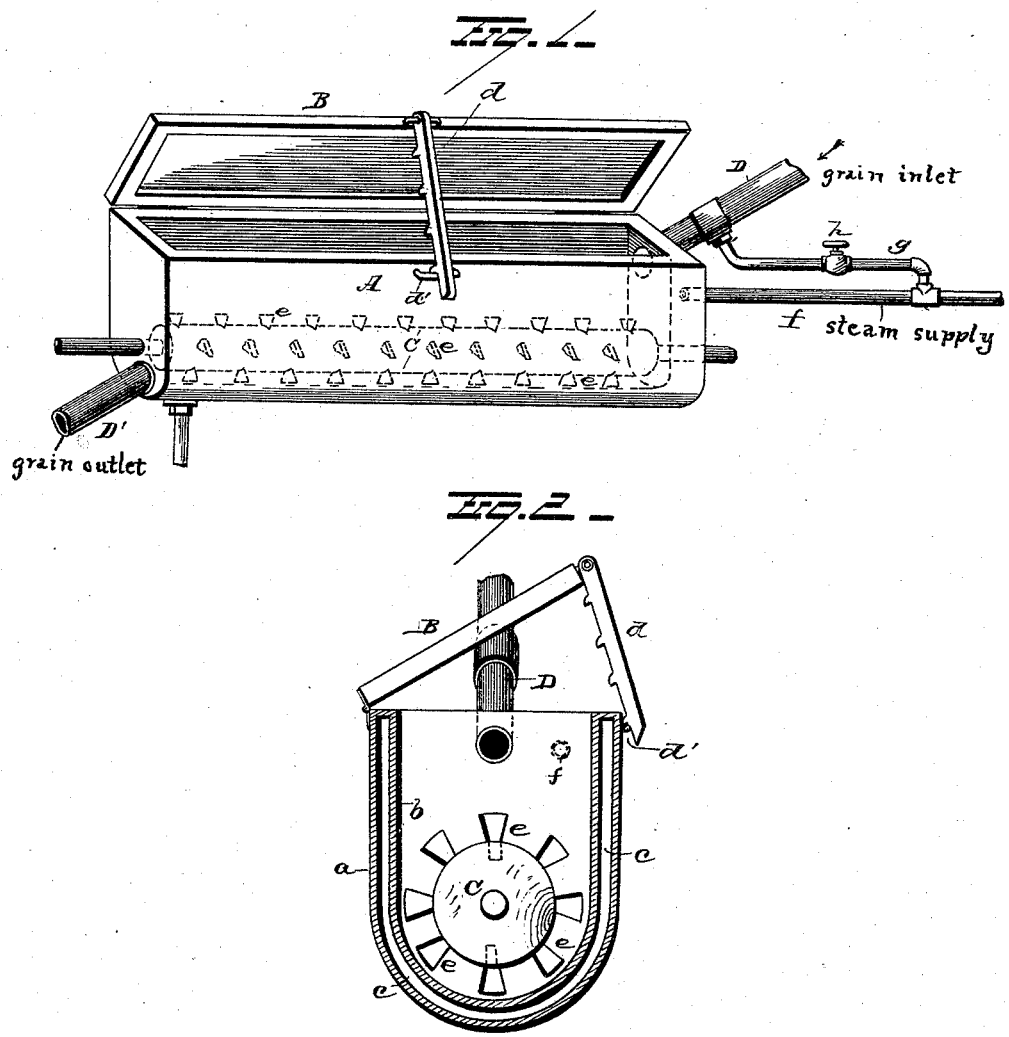

UNITED STATES PATENT OFFICE.

JAMES C. WELLER, OF DEFIANCE, OHIO.

GRAIN DRIER OR MOISTENER.

SPECIFICATION forming part of Letters Patent No. 474,568, dated May 10, 1892.

Application filed February 27, 1891. Serial No. 383,066. (No model.)

*To all whom it may concern:*

Be it known that I, JAMES C. WELLER, a citizen of Defiance, in the county of Defiance and State of Ohio, have invented certain new and useful Improvements in Grain Driers or Moisteners; and I do hereby declare the following to be a full, clear, and exact description of the invention, such as will enable others skilled in the art to which it appertains to make and use the same.

My invention relates to an improvement in devices for drying, heating, steaming, and conveying grain, its object being to construct the device in such manner that it may be adapted to dry grain passed through it or moisten said grain at will.

A further object is to produce a device for the purposes stated, which shall be simple in construction, comprising a small number of parts, and effectual in the performance of its functions.

With these objects in view the invention consists in the combination, with a receptacle and a conveyer therein, of a grain-inlet, a grain-outlet, and means for supplying moisture to the grain inserted in said receptacle.

The invention also consists in the combination, with a receptacle comprising an inner and outer shell to produce an intermediate chamber, of a grain-inlet, a grain-outlet, a steam-supply pipe communicating with said chamber, and a pipe connecting said steam-supply pipe with the grain-inlet at a point in proximity to the connection of said inlet with the receptacle; and the invention also consists in certain novel features of construction and combinations and arrangement of parts, as hereinafter set forth, and pointed out in the claim.

In the accompanying drawings, Figure 1 is a perspective view of my invention. Fig. 2 is a sectional view.

A represents a receptacle preferably having a curved bottom and composed of two shells *a b* to produce a chamber *c* between them. The lid B of the box is preferably hinged to one longitudinal edge of the receptacle, and has loosely connected to its free longitudinal edge a notched bar *d*, adapted to engage a lip *d'* on the receptacle, whereby the lid may be propped up to any desired extent. Mounted in the bottom of the receptacle A is an agitator or conveyer C, said agitator or conveyer being composed of a drum having several series of teeth *e* secured thereto, said teeth being preferably flattened and arranged at an angle to the axis of the drum. An inlet-tube D communicates with one end of the receptacle at its top, and an outlet-tube D' communicates with the other end of the receptacle near its bottom. Communicating with the chamber *c* is a steam-pipe *f*, whereby the receptacle may be heated and the grain therein heated and dried while passing through the receptacle and being agitated by the teeth *e*. During this heating and drying operation the lid B will preferably be propped up. A pipe *g* is connected at one end with the steam-pipe *f*, and at the other end communicates with the grain-inlet tube D at a point where said inlet-tube is connected with the receptacle, said pipe *g* being provided with a valve *h*. When the grain is too dry, the lid of the box will be closed and the valve *h* opened to admit steam to the inlet-tube D, where it will mix with the grain before it enters the receptacle.

By the employment of my improved device the proper humidity of the hull of the wheat will be secured and the undue pulverization of the hull thus prevented.

Having fully described my invention, what I claim as new, and desire to secure by Letters Patent, is—

The combination, with a receptacle having a steam-space formed around it, pipe D for supplying material to be treated, pipe D' for discharging the material, and a conveyer within the receptacle, of steam-pipe *f*, discharging into the steam-space around the receptacle, and a pipe *g*, leading from steam-pipe *f* and discharging into feed-pipe D, substantially as set forth.

In testimony whereof I have signed this specification in the presence of two subscribing witnesses.

JAMES C. WELLER.

Witnesses:
HENRY G. BAKER,
R. A. NEFF.